United States Patent
Bao et al.

(10) Patent No.: US 11,804,620 B2
(45) Date of Patent: Oct. 31, 2023

(54) RATIONAL DESIGN OF REDOX MEDIATOR FOR FAST AND ENERGY-EFFICIENT CHARGING OF SULFUR CATHODES

(71) Applicant: The Board of Trustees of the Leland Stanford Junior University, Stanford, CA (US)

(72) Inventors: Zhenan Bao, Stanford, CA (US); Yi Cui, Stanford, CA (US); Yuchi Tsao, Palo Alto, CA (US); Min Ah Lee, Seoul (KR)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 721 days.

(21) Appl. No.: 16/967,851

(22) PCT Filed: Feb. 6, 2019

(86) PCT No.: PCT/US2019/016899
§ 371 (c)(1),
(2) Date: Aug. 6, 2020

(87) PCT Pub. No.: WO2019/157088
PCT Pub. Date: Aug. 15, 2019

(65) Prior Publication Data
US 2021/0050624 A1 Feb. 18, 2021

Related U.S. Application Data

(60) Provisional application No. 62/627,458, filed on Feb. 7, 2018, provisional application No. 62/626,936, filed on Feb. 6, 2018.

(51) Int. Cl.
H01M 10/0567 (2010.01)
H01M 4/58 (2010.01)
H01M 10/052 (2010.01)
H01M 10/0568 (2010.01)
H01M 4/02 (2006.01)

(52) U.S. Cl.
CPC ..... H01M 10/0567 (2013.01); H01M 4/5815 (2013.01); H01M 10/052 (2013.01); H01M 10/0568 (2013.01); H01M 2004/028 (2013.01); H01M 2300/0025 (2013.01)

(58) Field of Classification Search
CPC .......... H01M 10/0567; H01M 10/052; H01M 10/0568; H01M 4/5815; H01M 2004/028; H01M 2300/0025
See application file for complete search history.

(56) References Cited

U.S. PATENT DOCUMENTS

| | | | | |
|---|---|---|---|---|
| 2016/0006039 A1* | 1/2016 | Cosnier | ............... | H01M 4/9008 429/7 |
| 2017/0222226 A1* | 8/2017 | Helms | .................. | C07D 209/58 |
| 2017/0279122 A1* | 9/2017 | Helms | ...................... | C08K 3/04 |
| 2023/0223651 A1* | 7/2023 | Fan | ..................... | H01M 50/431 264/129 |

\* cited by examiner

Primary Examiner — Jane J Rhee
(74) Attorney, Agent, or Firm — LUMEN PATENT FIRM

(57) ABSTRACT

A battery electrolyte solution is that includes an organic electrolyte solution, a lithium-sulfur ($Li_2S$) compound, soluble lithium polysulfide ($Li_2S_x$) microparticles, and a redox mediator comprising a soluble quinone derivative.

20 Claims, 6 Drawing Sheets

Direct oxidation of Li$_2$S

Small-molecule mediated oxidation of Li$_2$S

FIG. 1E  FIG. 1F

1st cycle    FIG. 3A    250th cycles

- homogeneous distribution of particles with the original shape even after 250 cycles

- heterogeneous morphology + unreacted $Li_2S$

RATIONAL DESIGN OF REDOX MEDIATOR FOR FAST AND ENERGY-EFFICIENT CHARGING OF SULFUR CATHODES

FIELD OF THE INVENTION

The present invention relates generally to current collectors. More particularly, the invention relates to activating a sulfur cathode to near its equilibrium potential by adding a small aromatic molecule in the electrolyte as a redox mediator (RM).

BACKGROUND OF THE INVENTION

Lithium-sulfur (Li—S) batteries are a sustainable and cost-effective solution for next generation energy storage to support renewable energy integration due to the natural abundance of sulfur. Li—S batteries can theoretically store an energy density of 2500 Wh kg$^{-1}$, a five-fold increase compared to traditional lithium ion batteries (LIBs). Such exceptionally high energy density is enabled by the reversible conversion reaction between sulfur and lithium sulfide (Li$_2$S) via a series of lithium polysulfides intermediates (LiPSs, Li$_2$S$_n$, 2≤n≤8). However, significant challenges remain in order to build practical Li—S batteries, which are mainly attributed to the solubility of LiPSs in the electrolytes and the insulating nature of both sulfur and Li$_2$S. For examples, when charging a Li$_2$S electrode, a significant portion of each particle is electrically isolated and can be oxidized at the localized interface between the electrode/electrolyte with sufficient charge transfer; therefore, the Li$_2$S exhibits a large overpotential and a limited reversible capacity that is substantially lower than the theoretical value. Furthermore, the dissolution-precipitation process yields insulating deposits of S and Li$_2$S, which passivate the active interface for the redox reaction. Such evolution of the electrode architecture recurring over cycling is thus considered one of the primary causes of capacity fading in Li—S batteries together with internal polysulfides shuttling. Consequently, Li—S cells have been shown to have insufficient practical energy density, poor rate capability, and limited cycle life, collectively restricting commercial success of this system.

To address the aforementioned issues, considerable efforts have focused on incorporating nanostructured conductors, such as transition metals (Fe, Cu, Co), metal oxides, metal sulfides, metal nitrides, metal carbides, carbon nanomaterials, and conductive polymers. The electrochemically active area in the electrode significantly improved through these approaches, and LiPSs diffusion was further suppressed when appropriate physical confinement was attained. However, this improvement was often accomplished at the expense of the tap density with low active material loadings and would require costly production processes. Also, this approach does not necessarily prevent detachment of active particles from a conductive support and passivation of redox active sites upon long-term cycling during the solid-liquid-solid transition. Employing chemical interactions between LiPSs and hosts can better trap the sulfur species, but this effect is specific to the host surfaces, raising concerns about practical viability of requiring an ultrahigh-surface-area matrix. Therefore, breakthroughs are still needed to develop a low cost, scalable and reliable method to improve the practical performance of Li—S batteries.

Introducing redox mediators (RMs) to the electrolyte solution represents another effective strategy to address the limited performance of Li—S batteries. This approach relies on electrochemical oxidation of RMs in solution which can in turn chemically oxidize the active material on the entire surface of the particle. This additional charge transfer route beyond the localized interface enables homogeneous and complete oxidation of the electrode with a reduced overpotential. This approach has been primarily explored in lithium-oxygen (Li—O$_2$) batteries, which suffer from the poor electronic conductivity of Li$_2$O$_2$. Properly designed RMs have been shown to reduce the charge overpotential of Li$_2$O$_2$ by less than 0.1 V and protect both the electrolyte and carbon electrodes from degradation, significantly improving the energy efficiency and cycling stability of Li—O$_2$ cells. In contrast, the research in utilizing RMs in Li—S batteries is still in its infancy. Soluble LiPSs are known to serve as an internal RM if available, but their transient nature renders LiPSs unreliable in the cell at fully discharged or charged states. So far, only metallocene has been confirmed to shuttle electrons during Li$_2$S oxidation, which can reduce the initial charge potential of Li$_2$S electrodes to 2.9 V. Lithium iodide (LiI) was also reported to reduce the polarization, but later it was found that it actually modified Li$_2$S surfaces; regardless, the charging occurs at 2.8 V, which still deviates from the Li$_2$S equilibrium potential. Hence, the lack of proper redox chemistry has hindered the potential of employing RMs in Li—S batteries when compared to Li—O$_2$ batteries.

What is needed is a quinone redox chemistry to enable a new RM for fast and stable cycling of Li—S batteries.

SUMMARY OF THE INVENTION

To address the needs in the art, a battery electrolyte solution that includes an organic electrolyte solution, a lithium-sulfur (Li$_2$S) compound, soluble lithium polysulfide (Li$_2$S$_x$) microparticles, and a redox mediator comprising a soluble quinone derivative.

In one aspect of the invention, the quinone derivative includes 1,5-bis(2-(2-(2-methoxyethoxy)ethoxy)ethoxy)anthra-9,10-quinon (AQT).

In another aspect of the invention, the soluble polysulfide Li$_2$S$_x$ is a compound that includes Li$_2$S$_2$, Li$_2$S$_4$, Li$_2$S$_6$, Li$_2$S$_8$, and Li$_2$S$_x$—S, where x={2, 4, 6, 8}.

According to a further aspect of the invention, a reduction energy level of the redox mediator is higher than an oxidation energy level of the battery electrode active material.

In yet another aspect of the invention, a reduction potential of the redox mediator is higher than an oxidation potential of the battery electrode active material.

According to one aspect of the invention, a reduction energy level of the redox mediator is higher than an oxidation energy level of the redox mediator. In one aspect, a reduction energy level of the redox mediator is higher than an oxidation energy level of the Li$_2$S compound. In another aspect, the reduction energy level is in a range of 2.15 V to 2.3 V. In a further aspect, an oxidation energy level of the redox mediator is higher than and proximal to an oxidation energy level of the Li$_2$S compound.

According to one aspect, the reduction energy level is in a range of 2.15 V to 2.3 V.

In one aspect of the invention, a redox potential of the quinone derivative ranges from 1.7 V to 3.2 V.

According to one embodiment the invention includes a Li—S battery having an anode, a cathode, an organic electrolyte solution, a current collector, a lithium-sulfur (Li$_2$S) compound a soluble lithium polysulfide (Li$_2$S$_x$) microparticles, and a redox mediator comprising a soluble quinone derivative.

In one aspect of the current invention, the quinone derivative includes 1,5-bis(2-(2-(2-methoxyethoxy)ethoxy)ethoxy)anthra-9,10-quinon (AQT).

In another aspect of the invention, the soluble polysulfide $Li_2S_x$ includes a compound selected from the group consisting of $Li_2S_2$, $Li_2S_4$, $Li_2S_6$, $Li_2S_8$, and $Li_2S_x$—S, where x={2, 4, 6, 8}.

According to a further aspect of the invention, a reduction energy level of the redox mediator is higher than an oxidation energy level of the redox mediator.

In yet another aspect of the invention, a reduction energy level of the redox mediator is higher than an oxidation energy level of the $Li_2S$ compound. In one aspect, the reduction energy level is in a range of 2.15 V to 2.3 V. In a further aspect, an oxidation energy level of the redox mediator is higher than and proximal to an oxidation energy level of the $Li_2S$ compound. Here, the reduction energy level is in a range of 2.15 V to 2.3 V.

According to one aspect of the invention, a redox potential of the quinone derivative ranges from 1.7 V to 3.2 V.

BRIEF DESCRIPTION OF THE DRAWINGS

FIGS. 1E-1F show a comparison of discharge rates for AQC vs. AQT, according to the current invention.

FIGS. 3A-3C show, in the presence of AQT, the original morphology of $Li_2S$ particles was virtually unchanged over 250 cycles, according to the current invention.

DETAILED DESCRIPTION

Figure 1A:
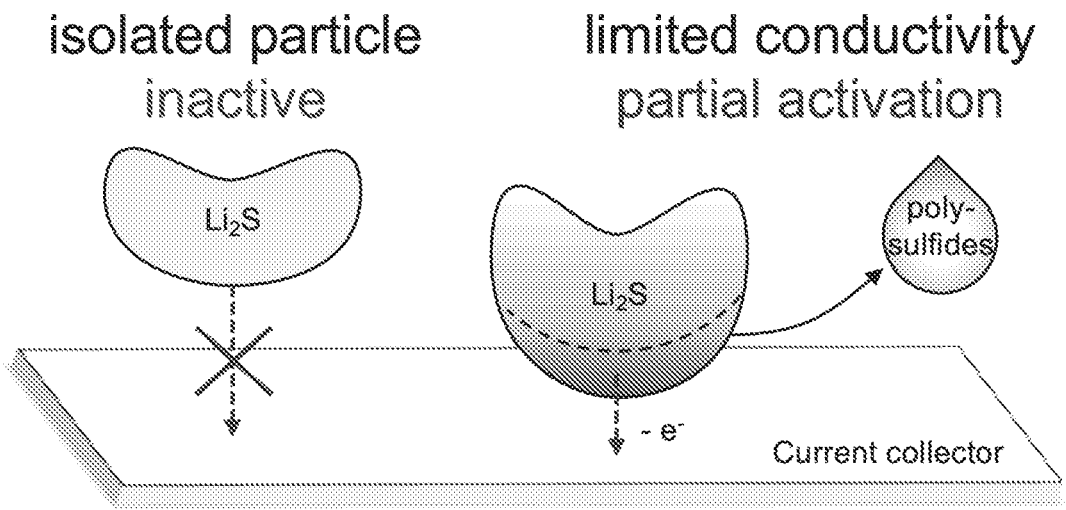
FIG. 1A shows the typical voltage profile of a $Li_2S$ electrode in the first cycle at 0.3 C using monodispersed microparticles (μ-$Li_2S$, 1.26 μm average diameter).

The development of $Li_2S$ electrodes is a crucial step toward the industrial manufacturing of Li—S batteries, a promising alternative to Li-ion batteries due to their projected two times higher specific capacity. However, the high voltages needed to activate $Li_2S$ electrodes, and the consequent electrolyte solution degradation, represent the main challenge. Hence, the discovery of effective catalyst is an important step to solving this problem. According to the current invention, a series of organic RM candidates are selected as a model system to identify the key factor in determining the catalytic activities and in Li—S cells. It is revealed that the level of oxidation potential, ability to oxidize $Li_2S$ and solubility play an important role for activating $Li_2S$ electrode. It is demonstrated that they are critical in reducing the overpotential of the $Li_2S$ electrode. Accordingly, the current invention provides a general principle for designing feasible catalyst and report a RM, AQT, with a remarkably low overpotential. The discovery leads to high rate cycle stability (1 C) can be achieved in 700 cycles with an only decay rate of 0.034% per cycle.

The current invention provides an effective strategy to activate a sulfur cathode near its equilibrium potential by adding a small aromatic molecule in the electrolyte as a redox mediator (RM).

The insulating nature of $Li_2S$ particles hinder the charge transfer process and require intimate contact with current collectors to become activated. This stringent limitation leads to large first charge cycle polarization and decay of charge capacity. To address these issues, a redox mediator (RM) can be used to completely re-route charge transfer process between $Li_2S$ particles and current collectors. RM can chemically oxidize $Li_2S$ particles (Step 1 chemical reactions: RM become RM2−), diffuse to current collectors and unload the electrons (Step 2 electrochemical reactions: RM2− become RM). Since RM can be continuously regenerated, small quantities of RM can catalytically shuttle electrons for entire cathodes efficiently. Notably, RM can patrol the cathode compartment by free diffusion to identify and react with $Li_2S$ particles, not in proper contact with current collectors. Hence, RM fundamentally resolves issues imposed by insulating $Li_2S$ particles. Spontaneous chemical oxidation of $Li_2S$ particles by RM necessitates the reduction potential of RM higher than $Li_2S$ oxidation potential (2.15V). Further, since RM is responsible for the release of electrons to current collectors, the cathode oxidation potential is now determined by oxidation potential of RM (the potential from RM2− to RM). Therefore, selecting RM with oxidation potential close to 2.15 V can substantially reduce the first charge overpotential (~3.5V). Moreover, by introducing two triethylene glycol monomethyl ether groups on the RM core, the resulting molecule (denoted as AQT) shows substantial improvement in the solubility, resulting in outstanding charge potential improvement and cycle stability.

Applications:
1. Traditional approaches mostly require fabrication of complicated electrodes structures, which could adversely increase battery production costs. The redox mediator (RM) of the current invention could be easily blended into the electrolyte and dropcasted on the electrodes. Thereby, it is foreseen that the RM is a promising material that permits scalable production of high performing $Li_2S$ cathodes.
2. The energy design principle is universal, which can be applicated in all other unconducive battery materials.

Because most research is focused on producing the nanoparticle $Li_2S$ or creating an encapsulating structure with conductive materials to solve the insulating nature of sulfur materials, the synthesis is too complicated. In one aspect of the invention, the mediator approach is less complex—just dissolve the RM in the electrolyte without any synthetic procedure of electrode materials.

According to the current invention, the approach is universal for Li—S batteries that does not change either the electrolytes or the electrode of the battery system. In essence, the current invention provides an effective, simple and universal approach that can easily implant any method that has been provided in the Li—S battery field.

Many strategies have been proposed to improve first charge cycling performance. First, many efforts have been dedicated to improving contact of $Li_2S$ particles with conducting materials by blending or encapsulating $Li_2S$ with high-surface-area conductive material. Common conductive materials include transition metal (Fe, Cu, Co), transition metal oxide or carbide, carbon materials (e.g., graphene and carbon nanofibers) and conductive polymers. However, the first charge overpotential is still limited to above 2.8 V.

Second, incorporation of RM is another promising approach. However, all literature reported RMLi$_2$S cathodes still show first charge overpotential above 3V. According to the current invention, AQT disclosed herein is the only RM that can significantly reduce overpotential down to 2.4V up to 0.5 C charge rate, and outperforms current literature reported counterparts. An enhanced cycle stability is also demonstrated by AQTLi$_2$S electrode. The cycle retention has improved from 60% to 81% in 350 cycles compared to the bare Li$_2$S electrode. Moreover, only a few studies successfully display high rate 1 C cycle stability over 1000 cycles, and electrode encapsulation is needed. Nevertheless, provided herein the cycle retention of 76% over 700 cycles can be successfully maintained. Furthermore, AQT could successfully resolve first charge overpotential in high mass loading Li$_2$S cathodes (3-6 mg/cm$^2$) and maintain high cycling stability up to 100 cycles (900 mAh/gs).

According to the current invention, a rational design principle has been created for the sulfur cathode, including potential selection rule, solubility effect for different functional group tuning. This leads to finding a chemical structure that is the most suitable RM for sulfur battery cathode.

Due to the insulating nature of Li$_2$S, hinders the charge transfer process between Li$_2$S and current collector, causing large polarization in the first cycle, accumulation of unreacted Li$_2$S during cycles. The thick and inhomogeneous Li$_2$S would eventually block the cathode and cause a death cell. Besides, because of repeated dissolution-deposition process of polysulfide, Li$_2$S loses intimate contact with current collector and therefore becomes inactive (isolated Li$_2$S) in the subsequent cycling. But with adding small molecule (RM) to the electrolyte that reversibly accept and donate electrons at known potential, it can completely re-route the electron transfer process between Li$_2$S and current collector by shuttling electrons between Li$_2$S and current collector continuously, facilitating charge transfer kinetics throughout the electrode and making the isolated Li$_2$S active through cycling.

Turning now to a more specific discussion, lithium-sulfur (Li—S) batteries charge by oxidizing solid lithium sulfide (Li$_2$S) into sulfur (S$_8$) through soluble lithium polysulfide intermediates (Li$_2$S$_x$), enabling a high theoretical specific capacity of 1675 mAh g$_s^{-1}$. However, the insulating nature of sulfur and Li$_2$S results in large polarization and low sulfur utilization while the soluble polysulfides lead to internal shuttle upon charge and discharge. Furthermore, the redox reaction via the dissolution-precipitation route destroys the electrode architecture by passivating the active interface responsible for the redox reaction, and thus the performance of Li—S batteries deteriorates with cycling. Disclosed herein is the redox chemistry of a quinone derivative to realize efficient, fast, and stable operation of Li—S batteries using Li$_2$S microparticles. By adding a quinone derivative with tailored properties (e.g. oxidation potential, solubility, and electrochemical stability in the electrolyte) to an electrolyte as a redox mediator, initial charging of Li$_2$S electrodes occurs below 2.5 V at a 0.5 C rate, and the subsequent discharge capacity is as high as 1300 mAh g$_s^{-1}$. Moreover, deposition of dead Li$_2$S, which was the primary cause of increasing polarization and decreasing reversible capacity of Li—S batteries upon cycling, is effectively prevented with the addition of the redox mediator.

Here, quinone redox chemistry is used to design a new RM for fast and stable cycling of Li—S batteries. Through rational tuning of the redox potential, stability, and solubility of quinones by molecular engineering, it is successfully demonstrated that the quinone redox can facilitate the initial oxidation of Li$_2$S below 2.5 V at a fast rate of 0.5 C. The continuing effectiveness of the quinone-based RM beyond the first cycle was confirmed with observation of the minimal polarization and improved capacity retention of Li—S cells over prolonged cycles. Importantly, when cycled with the RM, the Li$_2$S electrode maintained its original morphology over 250 cycles, suggesting a unique mechanism that enables controlled deposition of Li$_2$S and sulfur instead of random deposition. Thus, minimal overpotential and high capacity continued over prolonged cycling. Because of these collective attributes, a high mass loading electrode of 6 mg cm$^{-2}$ Li$_2$S was used to successfully demonstrate charging below 2.5 V with a reversible capacity of 952 mAh g$_s^{-1}$. This effective strategy of using tailored RMs in sulfur redox chemistry to improve both reaction kinetics and stability is the key to obtaining high practical power and energy density over prolonged cycling for the practical implementation of Li—S batteries.

Turning now to a discussion of large overpotentials for Li$_2$S cathodes, due to poor electronic conductivity, Li$_2$S electrodes are difficult to activate. The oxidation reaction only occurs at the localized regions of the active particles directly interfacing electron and ion transfer channels. This mechanism thus requires a large overpotential, and the cell exhibits a specific capacity much lower than the theoretical value. FIG. 1A shows the typical voltage profile of a Li$_2$S electrode in the first cycle at 0.3 C using monodispersed microparticles (µ-Li$_2$S, 1.26 µm average diameter), and the conventional electrolyte for Li—S batteries [i.e., 1 M lithium bis(trifluoromethanesulfonyl) imide in dioxolane/ dimethoxyethane (DOL/DME) with 2 wt % LiNO$_3$]. The electrolyte to Li$_2$S ratio was 28 µl mg$^{-1}$ which should be considered a flooded electrolyte condition. Upon charging, an overshoot as high as 3.6 V followed by a quick voltage drop to 2.6 V, then a high charge potential over 3.6 V was observed. A high charge cut-off voltage of 3.8 V, which exceeds the stability limit of ethereal electrolytes, was applied in an attempt to further activate Li$_2$S; however, the discharge capacity was still less than 800 mAh g$_s^{-1}$, indicating less than 50% sulfur utilization. At a lower rate of 0.1 C, the overpotential was reduced, permitting a lower charge cut-off voltage of 3.0 V; however, the discharge capacity remained insufficiently low, indicating a substantial amount of inactive Li$_2$S (52% sulfur utilization).

Figure 1B:
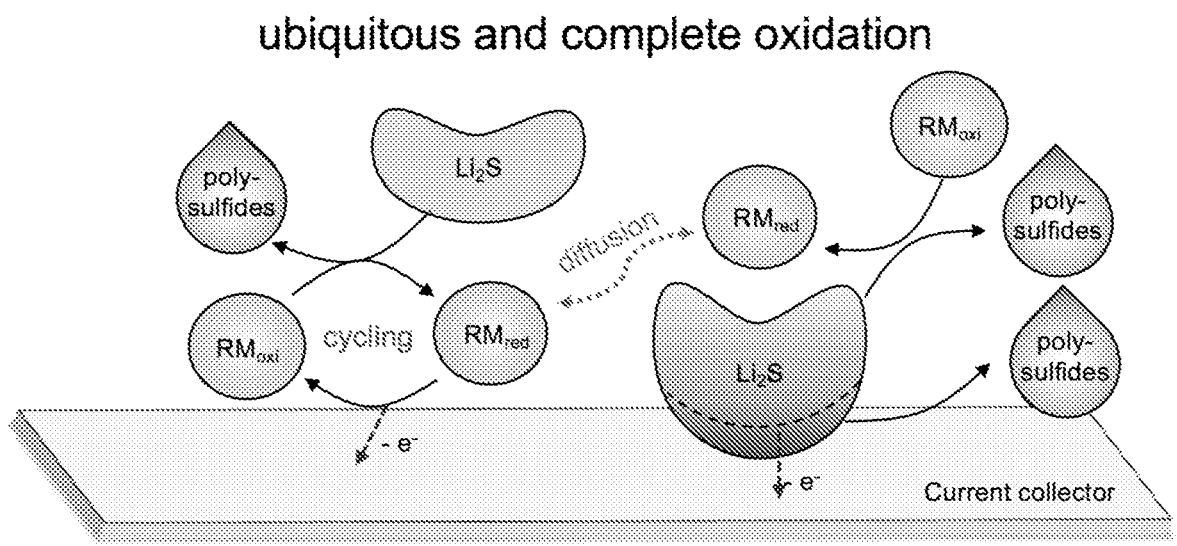
FIG. 1B shows the effective RMs solubilized in the electrolyte shuttle electrons between current collectors and the surfaces of isolated $Li_2S$ particles, which would have otherwise remained inactive, according to the current invention.

Effective RMs solubilized in the electrolyte shuttle electrons between current collectors and the surfaces of isolated Li$_2$S particles, which would have otherwise remained inactive (see FIG. 1B). During charging, the oxidized RMs with a redox potential higher than that of Li$_2$S can chemically oxidize Li$_2$S over the entire surface interfacing with the electrolyte and diffuse to current collectors where they are then electrochemically re-oxidized. Consequently, the charge voltage reflects the redox potential of the RM. Thus, the ideal redox potential of RMs would be slightly higher than the equilibrium potential of Li$_2$S (~2.15 V vs Li$^+$/Li) to minimize the hysteresis between charging and discharging in order to maximize energy efficiency. However, RMs in literature including ferrocene (FC) and decamethylferrocene exhibit significantly higher redox potentials at 3.4 V and 2.9 V vs Li$^+$/Li, respectively. To design RMs with better matched redox potentials, the redox activity of quinones are disclosed herein. The redox potentials of quinone molecules range from 1.7 V to 3.2 V vs. Li$^+$/Li depending on the molecular structure. It is rationalized here that anthraquinone (AQ) derivatives possess lower redox potential than benzoquinone (BQ) derivatives due to the electron-rich benzene rings. Further, the molecular structure of AQ is tailored to control the solubility in DOL/DME electrolyte and stability to maximize RM efficiency.

Figure 1C:
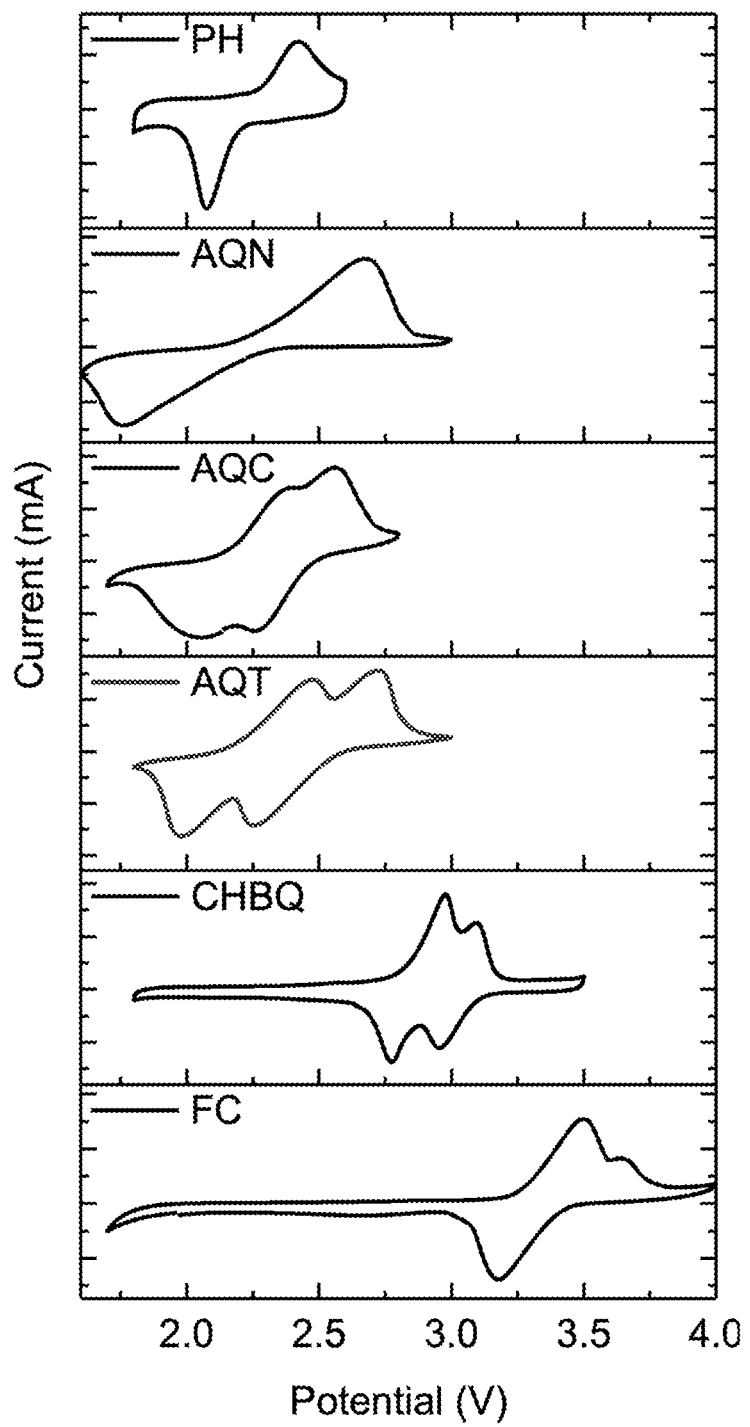
FIG. 1C presents cyclic voltammograms (CVs) of the RMs versus lithium metal in the DOL/DME electrolyte. When compared with FC, quinone derivatives showed more favorable redox potentials with are batter matched to that of $Li_2S$ oxidation, according to the current invention.

Anthraquinone-2-carboxylic acid (AQC) and 2,5-dichloro-1,4-benzoquinone (DCBQ) are selected as RMs to examine electrochemical properties. FIG. 1C presents cyclic voltammograms (CVs) of the RMs versus lithium metal in the DOL/DME electrolyte. When compared with FC, quinone derivatives showed more favorable redox potentials with are batter matched to that of $Li_2S$ oxidation. In particular, AQC is preferred to facilitate $Li_2S$ oxidation with minimal polarization. However, with continued cycling, the AQC had limited electrochemical stability in the operating condition of Li—S cells. Moreover, AQC had limited solubility (<20 mM) in the DOL/DME electrolyte, further limiting the usable RM quantity in the cell. To achieve a better RM polar substituents (triethylene glycol monomethyl ether) were introduced to the AQ center to yield 1,5-bis(2-(2-(2-methoxyethoxy)ethoxy)ethoxy) anthra-9,10-quinon (AQT), which exhibits similar redox potentials to AQC (FIG. 1C). AQT showed improved solubility (>500 mM) and markedly improved cycling stability compared to AQC, rendering the molecule more reliable as a RM.

Figure 1D:
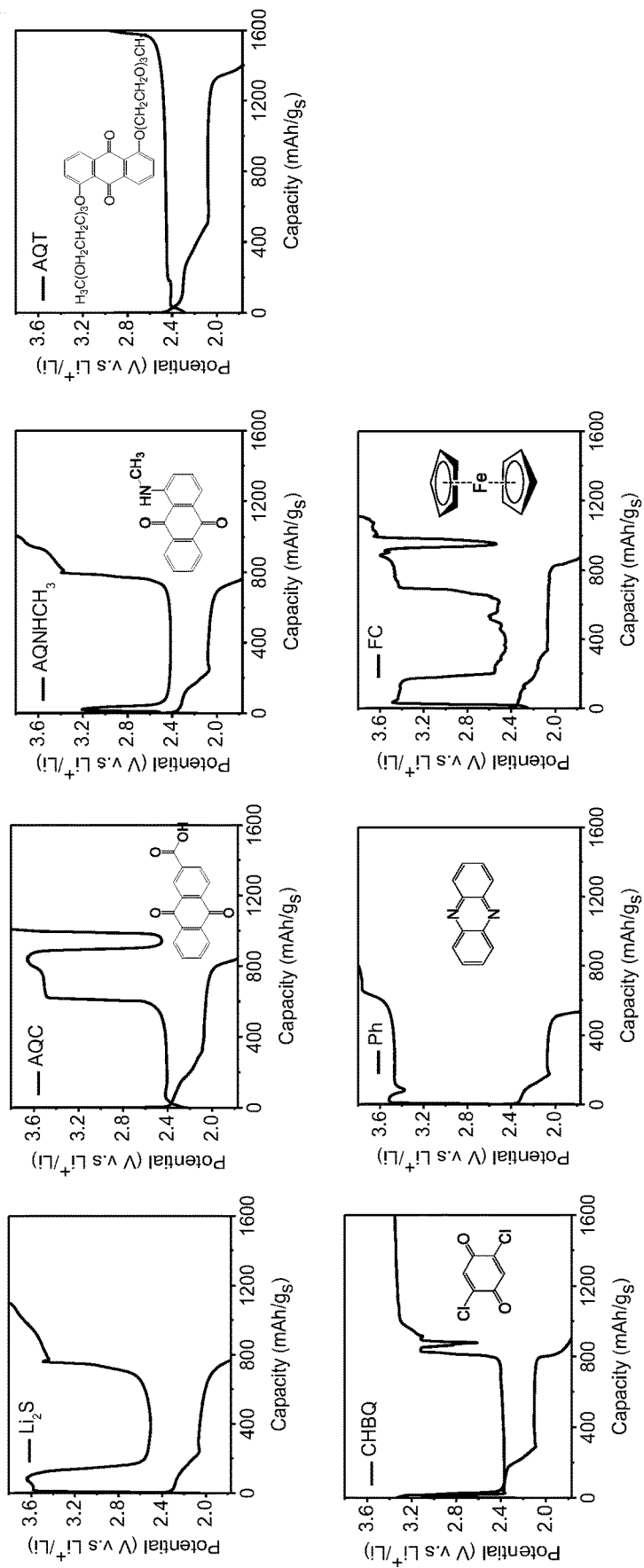
FIG. 1D shows the first cycle voltage profiles of $Li_2S$ electrodes with different RMs at 0.3 C, according to the current invention.

The first cycle voltage profiles of $Li_2S$ electrodes with different RMs at 0.3 C are shown in FIG. 1D. The same electrode and electrolyte condition used in FIG. 1A was employed for a comparative study except that 80 mM of RM was added to the electrolyte. The molar ratio of $Li_2S$ to RM was fixed to 10:1. In accordance with current invention rationales, AQT demonstrated exceptional performances when compared to other RMs. While the addition of both AQC and AQT prevents the initial overshoot upon charging, only AQT can oxidize $Li_2S$ at a constant potential below 2.5 V throughout the charging process. Remarkably, the cell with AQT exhibited much higher discharge capacity of 1402 mAh $g_s^{-1}$, corresponding to 85% sulfur utilization, than the cell with AQC. Even under the condition where AQC and AQT were both fully soluble (20 mM) (see FIGS. 1E-1F for a comparison of discharge rates), the cell with AQT showed a higher discharge capacity (810 mAh $g_s^{-1}$) than that with AQC (482 mAh $g_s^{-1}$), which may be due to the deteriorating stability of AQC during regeneration. On the other hand, DCBQ and FC showed limited improvement in promoting $Li_2S$ oxidation as expected since their redox potentials are significantly higher than 2.1 V. The initial voltage overshoot decreased but remained above 3.0 V and 3.4 V in for DCBQ and FC, respectively, which is consistent with their redox potentials. Once LiPSs were formed and available as the additional RM in the electrolyte, the voltage dropped to 2.6 V. As LiPSs were exhausted, the voltage rose back to the redox potential of DCBQ and FC, respectively, which was then followed by another dip in the profile by forming additional LiPSs. Given this insufficient activation of the $Li_2S$ electrode, the resulting discharge capacity did not improve considerably in either system when compared to the cell without RM.

From the energy efficiency and discharge capacity of the various RMs, it is determined that low polarization and high Coulombic efficiency lead to high energy efficiency. According to the current invention, the $Li_2S$ cell with AQT showed the highest discharge capacity (1402 mAh $g_s^{-1}$), lowest average charge potential (<2.5 V) and highest Coulombic efficiency (87%), thus exhibiting the highest energy efficiency among all tested RMs. Taken together, AQT with the desired redox potential, high solubility in the electrolyte and superior cycling stability is the most effective in promoting charge transport of $Li_2S$ cathodes among all the tested systems.

In one example, with 10 mM of AQT in the electrolyte, where the molar ratio between $Li_2S$ and AQT is 80 to 1, the overpotential during the first charging cycle can be effectively reduced. Nevertheless, as the AQT concentration increases, the reversible capacity and Coulombic efficiency increase. Thus, either 80 mM or 160 mM of AQT depending on the electrode mass loading in the following study to assure improved performance. When the electrolyte amount was also decreased from 20 µl to 10 µl, which corresponds to the electrolyte/$Li_2S$ of 14 µl $mg^{-1}$, the $Li_2S$ electrode can be still charged at 2.5V. Note that redox cycling of quinone is also effective in oxidizing ball-milled commercial $Li_2S$ with a more heterogeneous size distribution than the µ-$Li_2S$.

Notably, AQT performs better than $Li_2S_8$, the internal RM spontaneously formed during conventional sulfur redox processes. When adding 80 mM $Li_2S_8$ as a RM to the DOL/DME electrolyte, the charge capacity obtained below 2.5 V is less than 400 mAh $g_s^{-1}$ at 0.3 C, which is three-fold less than AQT. This result confirmed the need for a RM better than $Li_2S_8$ to minimize polarization during charging.

Next, the maximum C rate achieved was compared with various reported strategies using $Li_2S$ electrodes and the corresponding first average charging voltage. Methods such as mixing $Li_2S$ with nanostructured conductors like carbon, metals sulfides, and polymers still exhibited oxidation potentials of 2.8 V, 3.3 V, and 3.5 V, respectively, even at a slow rate (<0.1 C), simultaneously suffering from process complexity and lower active material loadings. Likewise, the previous best performing additives LiI and FC exhibited first charge potentials of 2.8 V at 0.05 C and 2.9 V at 0.2 C, respectively, which are far above the equilibrium potential of $Li_2S$. In comparison, AQT can facilitate $Li_2S$ oxidation at voltages as low as 2.45 V even at a high current density of 0.5 C, which demonstrated that this system has exceptionally fast charge transfer kinetics. The performance comparison is more reasonable when the critical cell parameters including areal mass loading, active content, and electrolyte/active ratio are considered in parallel. Note that the charge overpotential and the subsequent discharge capacity in this example study is remarkable despite using large particles, a high active content, and a comparable electrolyte to $Li_2S$ ratio.

Figure 2A:
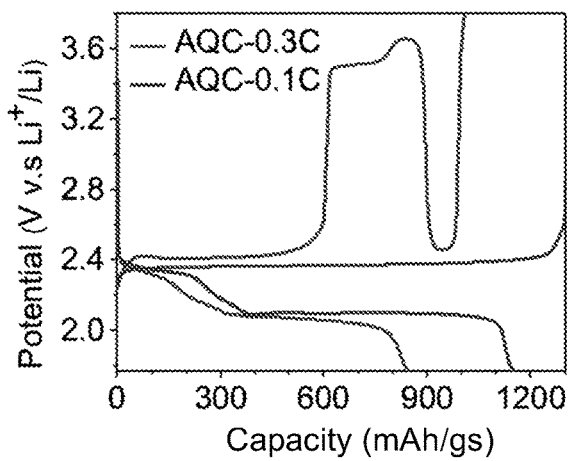
FIGS. 2A-2B show diagrams of the overpotential and energy levels relating to the RM's of the current invention.
Figure 2A:
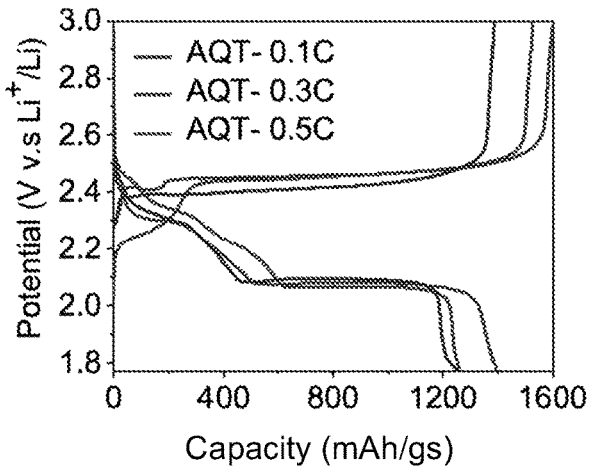
Figure 2A:
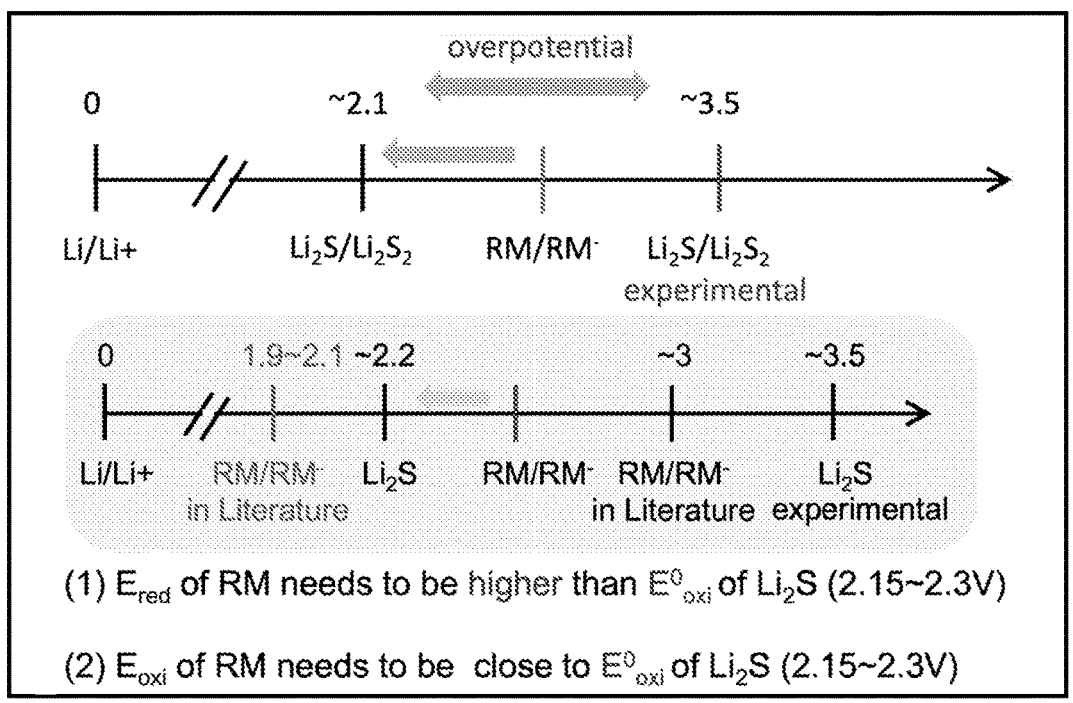
Figure 2B:
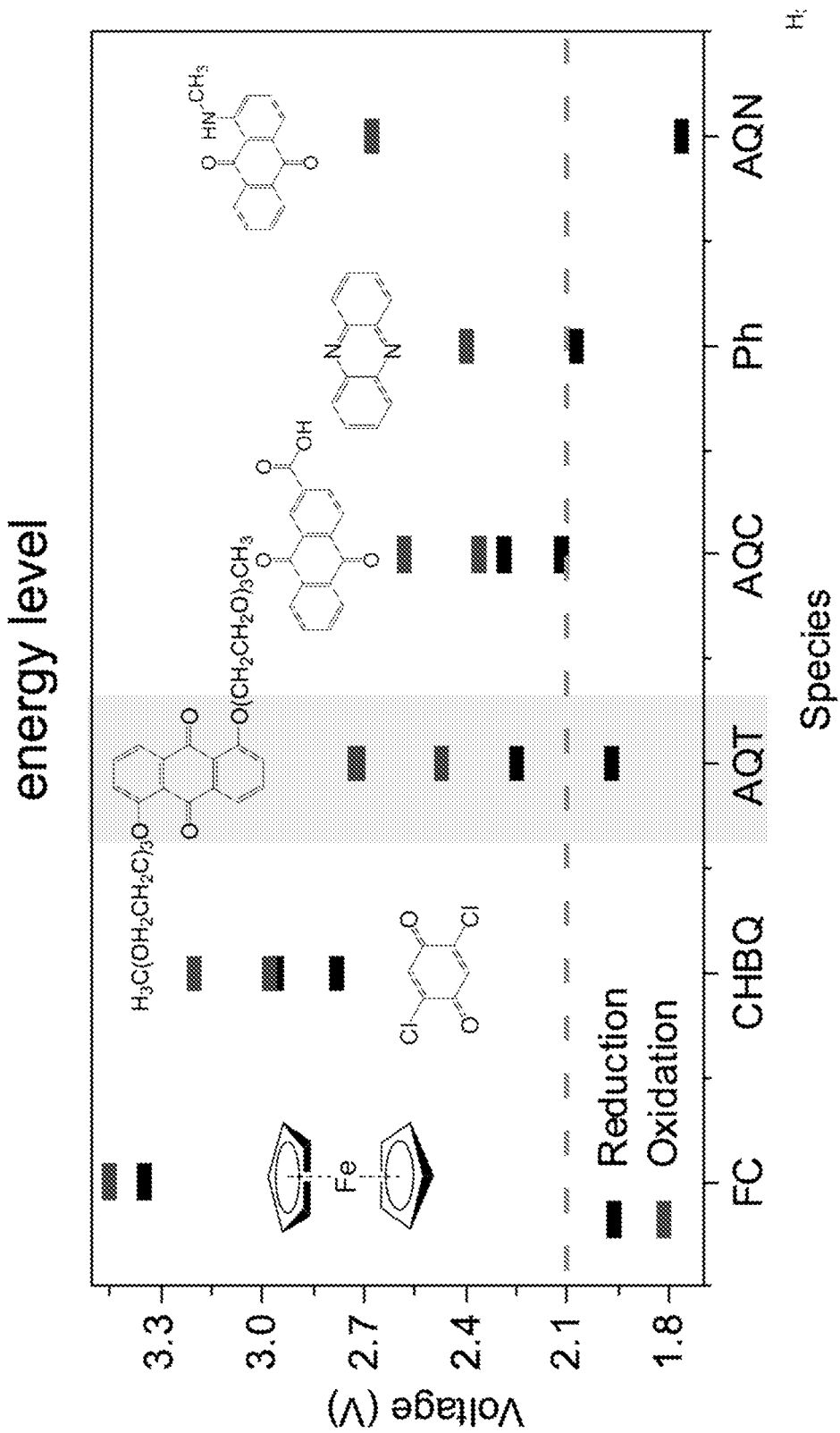

FIGS. 2A-2B show a diagrams of the overpotential and energy levels relating to the RM's of the current invention.

Turning now to the chemical reaction between AQT and $Li_2S$, the voltage profiles of half cells using 80 mM AQT in DOL/DME electrolyte (20 µl) with and without a $Li_2S$ electrode, exhibit capacities of 0.612 mAh and 0.059 mAh, respectively. Given that the charge voltage of the $Li_2S$ electrode overlaps with the voltage range of AQT at 2.4 V, the charge process should involve the direct electrochemical oxidation of AQT. In the galvanotactic discharge and charge of AQT (as a catholyte), it is confirmed that there exists stable reduction and oxidation of AQT with 80% capacity retention over 200 cycles and negligible redox shuttling of AQT with Coulombic efficiency higher than 98% throughout cycling. This result validates that AQT can continuously be reduced and oxidized in the presence of a lithium metal anode without significant degradation of the RM on the Li metal surface.

The spontaneous chemical reaction of $Li_2S$ oxidation by AQT was investigated by X-ray photoelectron spectroscopy (XPS). To probe changes in the oxidation state of $Li_2S$ when mixed with AQT in its oxidized state, the S2p binding energy of the Li$_2$S and AQT mixture (5:1 molar ratio) in the DOL/DME solvent were measured. The result was compared to that of blank Li$_2$S and chemically synthesized Li$_2$S$_4$. The S2p spectrum of Li$_2$S$_4$ shows two pairs of doublets at 161.20/162.4 eV and 162.8/163.9 eV, which corresponds to the terminal (S$_T^{-1}$) and bridge (S$_B^0$) S atoms, respectively, in addition to minor contributions from the unreacted Li$_2$S at 159.67.20/160.85 eV. Similarly, the mixture of Li$_2$S and AQT exhibited significant contribution at higher S2p binding energies than pristine Li$_2$S. This arises from the oxidation of Li$_2$S by AQT, and thus proves the spontaneous charge transfer between Li$_2$S and AQT.

The spontaneous chemical reaction of Li$_2$S oxidation by AQT is better understood by analyzing the reaction product. Since the reaction product simultaneously forms when we mix the Li$_2$S electrode and the AQT-containing electrolyte to fabricate the half cell, the product is thus able to be electrochemically analyze by directly discharging the half cell. The discharge profile of the half cell with a mixture of Li$_2$S and 160 mM AQT was compared with the cell without Li$_2$S and only having 160 mM AQT. Note that no discharge capacity would be exhibited when directly discharging pristine Li$_2$S. From the mixture, on the other hand, it is observed that a plateau exists at 2.25 V corresponding to the electrochemical reduction of the AQT$^-$, followed by a plateau at 2.1 V corresponding to the electrochemical reduction of Li$_2$S$_x$. Since the profile does not show the first reduction plateau of AQT at 2.45 V, it is confirmed that all of the AQT has been chemically converted into AQT$^-$ when mixed with Li$_2$S. Simultaneously, chemical oxidation of Li$_2$S into Li$_2$S$_x$ should occur. The discharge capacity is identical to that of pure AQT, indicating that the total amount of charge is retained and no side reaction occurs other than this process.

Further evidence of the charge transfer process between AQT and Li$_2$S was obtained with cyclic voltammetry. A cathodic sweep was conducted followed by an anodic sweep of AQT in DOL/DME electrolyte while gradually adding Li$_2$S$_4$. The second oxidation peak at 2.6 V (O2) showed significant current responses upon addition of Li$_2$S$_4$, while the first oxidation peak (O1) showed negligible changes. This result indicates that the concentration of AQT$^-$ to be oxidized at 2.6 V increases as the polysulfide concentration in the electrolyte increases due to the chemical regeneration of AQT$^-$ from AQT. It is hypothesize that the chemical regeneration of AQ$^-$ from AQ is promoted by Li$_2$S$_x$ (x<4), which can be formed during the previous cathodic sweep by reducing Li$_2$S$_4$. (for details, see Supplementary Note 1).

Turning now to the universal improvement in sulfur electrochemistry by AQT, the effectiveness of AQT to improve the Li—S battery operation beyond the first cycle was confirmed over continued cycling. During 10 cycles at 0.1 C, the blank Li$_2$S electrode showed repeated overshooting in the initial stage of charging and the capacity continuously decreased to 400 mAh g$_s^{-1}$. In contrast, with AQT, no voltage overshoot was observed during charging, and 96% of the capacity at the second cycle was retained in the 10th cycle. In the study, enlarged dQ/dV curves displayed two consistent reduction peaks from AQT over 10 cycles which were not observed in the pristine Li$_2$S cell, showing continuous redox activity of AQT over prolonged cycling.

To validate the effect of AQT to promote the sulfur electrochemistry generally, cells using a Li$_2$S$_8$ catholyte instead of a Li$_2$S electrode were fabricated. The cells were first discharged to reduce Li$_2$S$_8$ to Li$_2$S and comparable capacities were obtained regardless of the AQT presence because pristine AQT does not participate in the reduction of Li$_2$S$_8$. Then, the cell charging with AQT showed a slightly lower overpotential when compared to the blank cell, and the subsequent discharge capacity was much higher in the presence of AQT. Note that the increased capacity (307 mAh g$_s^{-1}$) in the second cycle cannot be fully accounted for the capacity contribution from AQT indicating more Li$_2$S can be activated with AQT in the Li$_2$S$_8$ catholyte cells as well. Upon prolonged cycling, the effect of AQT became prominent. Am average charge and discharge voltage of the Li$_2$S$_8$ catholyte cells with AQT at rates of 0.1 C, 0.3 C and 0.5 C were compared to the blank Li$_2$S$_8$ cell at 0.1 C. The reduced polarization by AQT remarkably persisted over 200 cycles, demonstrating consistent charge transport kinetics over many cycles, outperforming the blank cells.

For improving cycling stability of Li—S batters by AQT, it is found that adding AQT significantly enhances the cycling stability of Li—S batteries. At a current density of 1 C, the capacity of 850 mAh g$_s^{-1}$ was retained after 500 cycles in the presence of AQT, whereas the capacity of the bare Li$_2$S cell decayed drastically to 225 mAh g$_s^{-1}$ within 10 cycles. At a lower rate of 0.5 C, the capacity retention was still considerably better with AQT. This cycling stability is exceptional because it was achieved without specialized processing such as confinement or encapsulation of the sulfur species. The energy efficiency and Coulombic efficiency is also improved by adding AQT. It is also important to note that AQT does not accelerate the self-discharge discharge of Li—S batteries; but it prevents the capacity decrease due to the sulfur loss in later cycles, suggesting that shuttling of RM to the Li metal anode is negligible.

The capacity decay of Li—S batteries is attributed to the loss of active material due to the soluble intermediates and the propagation of electrochemically inactive portion by pulverisation and random deposition of insulating species during cycling. Therefore, to understand the origin of the improved cycle life with AQT, the effects of AQT on both polysulfide dissolution and Li$_2$S morphology evolution were explored.

Examined first was the solubility of representative LIPS species (Li$_2$S$_4$ and Li$_2$S$_8$) in DOL/DME upon AQT introduction. Polysulfide solutions (20 mM) were prepared as references, and an equivalent molar amount of AQT was added to the polysulfide solutions to prepare the mixtures. After filtering the solution to remove any particles, inductively coupled plasma optical emission spectrometry (ICP-OES) was used to quantify the total concentration of sulfur and lithium in the liquid phase. The Li$_2$S$_4$ and AQT mixture contained only 25% of the expected sulfur content from the original pristine Li$_2$S$_4$ solution, and the Li$_2$S$_8$ and AQT mixture also contained less than 55% of the sulfur content from the pristine Li$_2$S$_8$ solution. Therefore, introducing AQT decreased the amount of soluble sulfur species in the electrolyte. The decreased LiPSs solubility is attributed to the binding interaction between AQT and LiPSs.

Figure 3B:
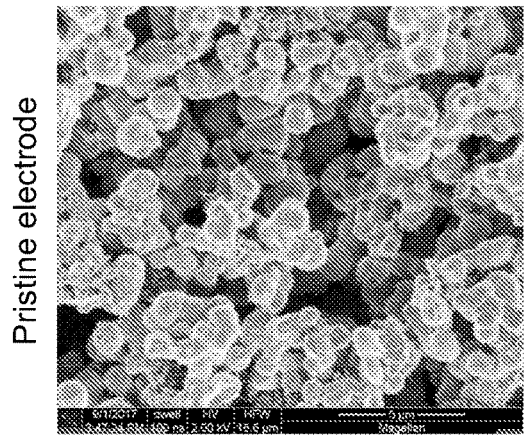
Figure 3B:
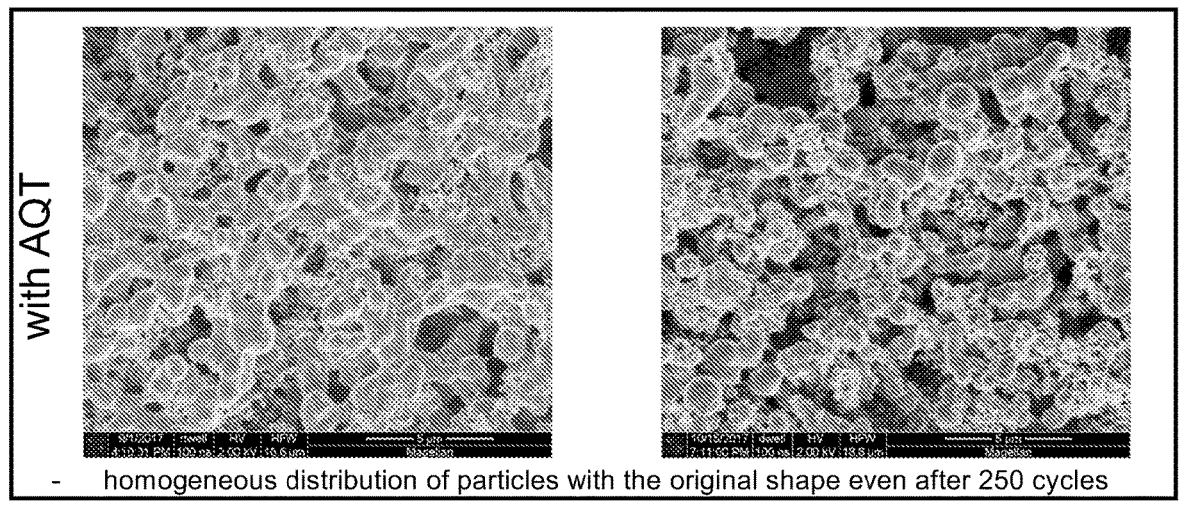
Figure 3C:
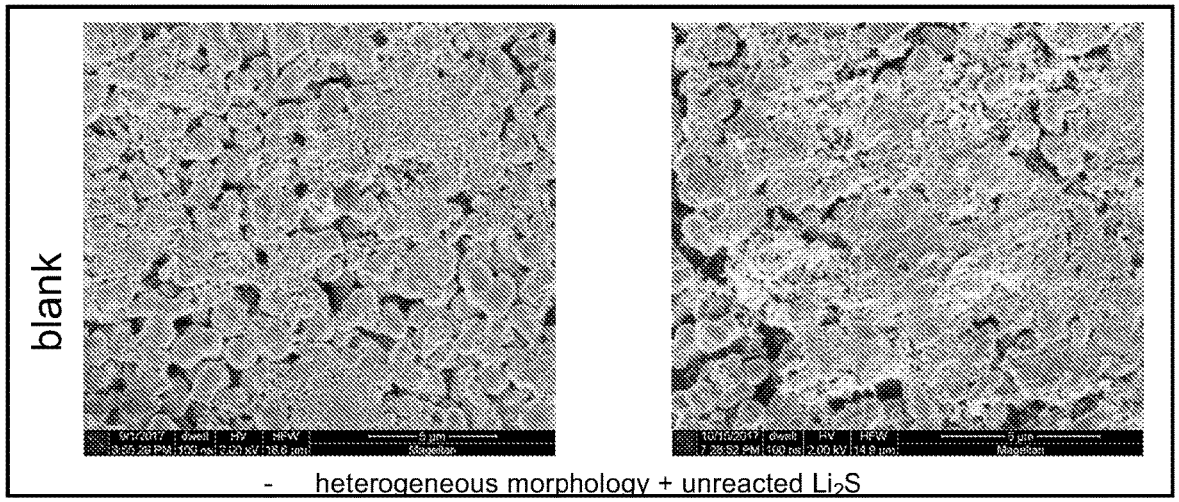

Next, the morphology evolution of Li$_2$S electrodes over many cycles was monitored. The Li$_2$S electrodes tested with and without AQT were retrieved after the first and 250th cycles, respectively, and examined by scanning electron microscopy (SEM). In accordance with the previous study under the conventional condition suffering from the recurring solid-liquid-solid transition, randomly deposited sulfur species that are different from the initial morphology were observed in the blank Li$_2$S electrode regardless of the cycle number and state of the charge. Such uneven accumulation of thick sulfur/Li$_2$S layers observed in SEM would block the charge transfer across the electrode/electrolyte interfaces and thus cause poor reaction kinetics and capacity decay. Nevertheless, in the presence of AQT, the original morphology of Li$_2$S particles was virtually unchanged over 250 cycles (FIGS. 3A-3C). Such phenomenon consistently was observed from multiple spots over the entire electrode. This controlled deposition of the solid species was identified as a critical feature to achieve long term cycling to maintain the efficient charge transfer kinetics of the original porous electrodes throughout the operation. The consistent morphology over prolonged cycling that accompanies the repeated solid-liquid-solid transition between Li$_2$S and S cannot be fully account for by the homogeneous oxidation over the Li$_2$S surface in the presence of AQT.

It is hypothesized that AQT can potentially alter LiPS-solvent interactions and determine sulfur speciation, as evidenced by the reduced solubility of LIPS with AQT, which in turn induces preferred deposition of Li$_2$S and S on the surfaces of active particles.

Further conducted was ex situ X-ray spectromicroscopy with the Li$_2$S electrodes in the charged state that had been cycled over 200 times. The maps were collected at multiple spots on each sample (as indicated with area #1 and #2) at energies of 2470.8, 2472.6, 2473.6, and 2476.4 eV, in order to differentiate between Li$_2$S, polysulfide, and elemental sulfur species. After cycling for 200 times in the presence of AQT, the fully charged electrode showed a homogeneous sulfur distribution and a trace of Li$_2$S throughout the electrode. In sharp contrast, when cycled without AQT, the Li$_2$S electrode displayed a localized region of sulfur with exceptionally high intensity (6-40 times higher than other regions) in the elemental sulfur map while also showing significant intensities from unreacted Li$_2$S in the Li$_2$S map. This is consistent with our SEM result showing heterogeneous conversion of sulfur during cycling. In sharp contrast, Thus, the results verify homogenous and complete conversion of sulfur over the entire electrode in the presence of AQT, which is highly desirable for improved energy density and cycle life. Due to the complex nature of sulfur speciation, further studies are needed to specify the sulfur redox mechanism with AQT by real-time monitoring of chemical and structural evolution of the electrode.

The above results suggest that AQT may effectively resolve poor charge transfer and heterogeneity in high mass loading electrodes. Thick Li$_2$S electrodes were tested with areal Li$_2$S loading of 4 and 6 mg cm$^{-2}$ in the presence of AQT. The first charge plateau remained below 2.6 V at 0.05 C throughout the charging process, and more than 950 mAh $g_s^{-1}$ of discharge capacity was obtained in both electrodes. This supports the hypothesis that the redox mediating function of AQT effectively facilitates Li$_2$S oxidation even in thick electrodes with an electrolyte to Li$_2$S ratio of 12.5 μl mg$^{-1}$. When cycled at 0.1 C over 100 cycles, the 4 mg cm$^{-2}$ electrode still exhibited a discharge capacity of 863 mAh $g_s^{-1}$ with an average Coulombic efficiency of 93.7% and the 6 mg cm$^{-2}$ electrode exhibited 606 mAh $g_s^{-1}$ with an average Coulombic efficiency of 92.8%. Notably, the above results were obtained by using μ-Li$_2$S (70 wt % of active content) without adopting any nanostructuring or hosts for the first time. This highlights the viability of using AQT as a practical strategy to dramatically improve the performance of Li$_2$S electrodes for Li—S batteries. Nevertheless, when combined with optimized electrode architectures, further improvements in the performance and cell parameters (e.g. mass loading and electrolyte amount) would be feasible and would truly translate our fundamental discovery to real applications.

Also confirmed was the charge transfer kinetics in the Li$_2$S cathode cycled with AQT is superior to that of the Li$_2$S$_8$ catholyte. A comparison of multiple charge profiles were taken over prolonged cycling of the Li$_2$S cathode with AQT against Li$_2$S$_8$ catholyte having the equivalent sulfur loading of 3 mg cm$^{-2}$ and the active content of 70%. Surprisingly, it was found that voltage profiles significantly evolved over time in the catholyte system whereas the profiles of the AQT-added Li$_2$S cathode remained unchanged for more than 100 cycles. When comparing the average voltage of charge and discharge curves over cycling for those two conditions, the results were reliably consistent and lower polarization was observed in the Li$_2$S electrode with AQT, highlighting stable and efficient sulfur redox cycling enabled by AQT.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A battery electrolyte solution comprising:
   a) an organic electrolyte solution;
   b) a lithium-sulfur (Li$_2$S) compound;
   c) soluble lithium polysulfide (Li$_2$S$_x$) microparticles; and
   d) a redox mediator comprising a soluble quinone derivative.

2. The battery electrolyte solution of claim 1, wherein said quinone derivative comprises 1,5-bis(2-(2-(2-methoxyethoxy)ethoxy)ethoxy)anthra-9,10-quinon (AQT).

3. The battery electrolyte solution of claim 1, wherein said soluble polysulfide Li$_2$S$_x$ comprises a compound selected from the group is consisting of Li$_2$S$_2$, Li$_2$S$_4$, Li$_2$S$_6$, Li$_2$S$_8$, and Li$_2$S$_x$—S, wherein x={2, 4, 6, 8}.

4. The battery electrolyte solution of claim 1, wherein a reduction energy level of said redox mediator is higher than an oxidation energy level of said battery electrode active material.

5. The battery electrolyte solution of claim 1, wherein a reduction potential of said redox mediator is higher than an oxidation potential of said battery electrode active material.

6. The battery electrolyte solution of claim 1, wherein a reduction energy level of said redox mediator is higher than an oxidation energy level of said redox mediator.

7. The battery electrolyte solution of claim 6, wherein a reduction energy level of said redox mediator is higher than an oxidation energy level of said Li$_2$S compound.

8. The battery electrolyte solution of claim 6, wherein said is reduction energy level is in a range of 2.15 V to 2.3 V.

9. The battery electrolyte solution of claim 6, wherein an oxidation energy level of said redox mediator is higher than and proximal to an oxidation energy level of said Li$_2$S compound.

10. The battery electrolyte solution of claim 9, wherein said reduction energy level is in a range of 2.15 V to 2.3 V.

11. The battery electrolyte solution of claim 1, wherein a redox potential of said quinone derivative ranges from 1.7 V to 3.2 V.

12. A Li—S battery comprising:
   a) an anode;
   b) a cathode;
   c) an organic electrolyte solution;
   d) a current collector;
   e) a lithium-sulfur (Li$_2$S) compound;
   f) soluble lithium polysulfide (Li$_2$S$_x$) microparticles; and g) a redox mediator comprising a soluble quinone derivative.

13. The Li—S battery of claim 12, wherein said quinone derivative comprises 1,5-bis(2-(2-(2-methoxyethoxy)ethoxy)ethoxy)anthra-9,10-quinon (AQT).

14. The Li—S battery of claim 12, wherein said soluble polysulfide $Li_2S_x$ comprises a compound selected from the group consisting of $Li_2S_2$, $Li_2S_4$, $Li_2S_6$, $Li_2S_8$, and $Li_2S_x$—S, wherein x={2, 4, 6, 8}.

15. The Li—S battery of claim 12, wherein a reduction energy level of said redox mediator is higher than an oxidation energy level of said redox mediator.

16. The Li—S battery of claim 12, wherein a reduction energy level of said redox mediator is higher than an oxidation energy level of said $Li_2S$ compound.

17. The Li—S battery of claim 16, wherein said reduction energy level is in a range of 2.15 V to 2.3 V.

18. The Li—S battery of claim 16, wherein an oxidation energy level of said redox mediator is higher than and proximal to an oxidation energy level of said $Li_2S$ compound.

19. The Li—S battery of claim 18, wherein said reduction energy level is in a range of 2.15 V to 2.3 V.

20. The Li—S battery of claim 12, wherein a redox potential of said quinone derivative ranges from 1.7 V to 3.2 V.

* * * * *